United States Patent [19]

Kauer

[11] Patent Number: 4,602,604
[45] Date of Patent: Jul. 29, 1986

[54] AIR COMPRESSING RECIPROCATING IN-LINE COMPRESSION-IGNITION INTERNAL COMBUSTION ENGINE

[75] Inventor: Erhard Kauer, Schützen, Austria

[73] Assignee: Steyr-Daimler-Puch Aktiengesellschaft, Vienna, Austria

[21] Appl. No.: 734,399

[22] Filed: May 15, 1985

[30] Foreign Application Priority Data

May 22, 1984 [AT] Austria ................................ 1680/84

[51] Int. Cl.[4] ........................ F02M 37/06; F01L 1/46
[52] U.S. Cl. .................................. 123/508; 123/90.44; 123/90.6
[58] Field of Search ...................... 123/507, 508, 90.6, 123/90.44, 90.27

[56] References Cited

U.S. PATENT DOCUMENTS 4,538,561  9/1985  Amemori et al. .................... 123/508

FOREIGN PATENT DOCUMENTS

| 3102905 | 1/1982 | Fed. Rep. of Germany . |
| 3146875 | 8/1982 | Fed. Rep. of Germany . |
| 42814 | 3/1938 | Netherlands ........................ 123/508 |
| 70985 | 2/1927 | Sweden .............................. 123/508 |
| 271476 | 10/1950 | Switzerland ........................ 123/508 |
| 2090911 | 7/1982 | United Kingdom ............. 123/90.44 |

OTHER PUBLICATIONS

Bartsch Verlag 1978—pp. 282 & 283.

*Primary Examiner*—Ira S. Lazarus
*Attorney, Agent, or Firm*—Karl F. Ross; Herbert Dubno

[57] ABSTRACT

An air compressing reciprocating in-line compression-ignition internal combustion engine comprises for each cylinder a fuel injection unit comprising a fuel injection pump and a fuel injection nozzle. Each fuel injection unit is operated by a camshaft via a rocker lever and a cam follower roller mounted on said lever. The camshaft is rotatably mounted between the cylinders in transverse walls provided on the cylinder heads. The camshaft carries injection control cams and valve control cams for actuating the gas exchange valves by means of cam follower levers, which are pivoted at one end to the cylinder head and at the other end engage the gas exchange valves and are provided with cylindrically curved engaging surfaces for contacting the valve control cams. In order to provide an arrangement which involves only small material and space requirements and results in lower stresses on the injection control cams, the valve control cams and the cam follower levers, the center of curvature of the engaging surface associated with any one of said cylinders surface and a valve accelerating surface of the associated valve control cam are connected by a line which includes a smaller angle in excess of 30° with the plane which is defined by the design center line of the camshaft and the axis of the cam follower roller for actuating the fuel injection unit that is associated with a cylinder that is adjacent to said given cylinder.

8 Claims, 1 Drawing Figure

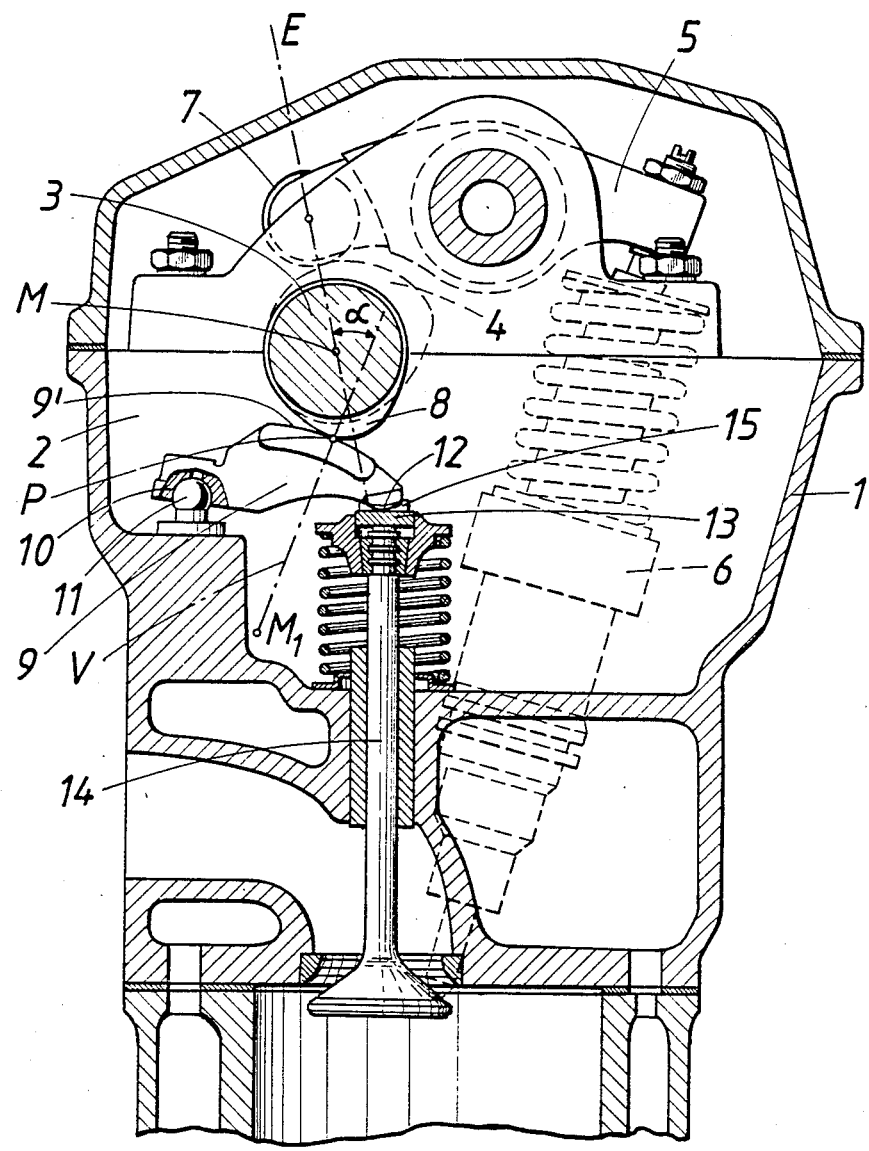

AIR COMPRESSING RECIPROCATING IN-LINE COMPRESSION-IGNITION INTERNAL COMBUSTION ENGINE

BACKGROUND OF THE INVENTION

1. Field of the Invention

This invention relates to an air compressing reciprocating in-line compression-ignition internal combustion engine comprising a plurality of fuel injecting units, which are associated with respective cylinders of the engine, and a camshaft which is mounted in cylinder head transverse walls extending between adjacent cylinders and carries injection control cams for actuating said fuel injection units by means of respective rocker levers and cam follower rollers mounted on said levers, wherein said camshaft carries beside each injection control cam valve control cams for actuating the gas exchange valves associated with one of said cylinders, and cam follower levers are provided, which are pivoted at one end in the cylinder heads of respective cylinders and at the other hand act on the gas exchange valves, possibly through intermediate elements, and have cylindrically curved surfaces engaging the calve control cams.

2. Description of the Prior Art

An engine provided with such cam mechanism is already known from Gnadt "Einspritzung bei Otto- und Dieselmotoren", Bartsch-Verlag, 1978, page 282). In that known engine the cam follower levers are pivoted on an axis which is parallel to the center line of the camshaft and each cam follower lever has a curved surface for rolling contact with the valve control cam and a nose, which is formed with a cylindrical surface and by means of an intermediate element consisting of a bucket tappet acts on the stem of the gas exchange valve. During an injection of fuel into a cylinder, the reaction force exerted by the cam follower roller of the associated rocker lever on the injection control cam acts approximately in a plane that is defined by the center line of the camshaft and the axis of the cam follower roller so that said force gives rise to bending moments tending to deform the camshaft in said plane. A disadvantage of that known cam mechanism resides in that the exertion of the fuel injection force on the injection control cam associated with a given cylinder will be accompanied by an exertion of additional forces on the injection control cams of one or both of the adjacent cylinders, in dependence on the ignition sequence. These additional forces will be due to the acceleration of the valve actuating linkage and owing to the location of the center of curvature of the engaging surface of the cam follower levers will act almost in the same plane as the fuel injection force so that they will increase the deflection of the camshaft. It must be borne in mind that the force which is due to the acceleration of the valve and exerted on each valve control cam reacts through the center of curvature of the engaging surface of the cam follower lever and the instantaneous point of contact between the engaging surface and the valve control cam. During the acceleration, that point of contact is moved to those surface portions of the cam which adjoin the base circle of the camshaft. Because the deflection of the camshaft causes the generatrices of each valve control cam to be inclined, the contacting surfaces of the valve control cam and of the cam follower ever may be overstressed so that the wear of said elements will increase and they will soon be destroyed.

The known cam mechanism has been disclosed for use with cylinders provided with precombustion chambers, into which the fuel is injected only under moderate pressure resulting only in a relatively small deflection of the camshaft. The disadvantage which has been explained hereinbefore will be encountered particularly in diesel engines which are designed for a direct injection of fuel and comprise fuel injection units for generating very high fuel injection pressures in order to effect the desired atomization of fuel for an optimum combustion. But those high pressures will result in strong reaction forces on the injection control cams so that the deflection of the camshaft will be excessive. Whereas the camshafts might be so large that they will resist such strong forces, this would involve a larger expenditure of material and an increase of various dimensions adjacent to the cylinder head.

Published German Application 3,210,165 describes a valve actuating mechanism in which a cam follower lever can be tilted out of the plane in which it is actuated. In that mechanism the cam follower lever is provided adjacent to the valve with a ball head pin, which is seated in a ball socket formed in an intermediate member that is transversely displaceable on the valve stem. In that arrangement, frictional forces are effective at the interface between the intermediate member and the valve stem and in the ball socket and that interface is relatively small so that the movement of the valve may result in a tilting of the intermediate member and inaccuracies may thus be introduced into the valve control. Besides, the center of gravity of the cam follower lever and its surface engaging the valve control cam are spaced a large distance from the axis of the tilting movement, which axis extends through the centers of the ball sockets. As a result, the cam follower levers may not be sufficiently tilted for an adaptation to the plane of deflection of the camshaft when the latter rotates at high speed.

SUMMARY OF THE INVENTION

It is an object of the invention to provide an engine of the type described first hereinbefore in which the cam mechanism is so designed that the stresses on the injection control cams and the cam follower levers cooperating with said cams will be reduced so that the deflection of the camshaft will be reduced too whereas the camshaft requires only a small space and a small expenditure of material.

This object is accomplished in accordance with the invention in that the center of curvature of the engaging surface of each cam follower lever associated with a given cylinder and any point of contact between that engaging surface and the valve accelerating surface of the associated cam are connected by a line which includes a smaller angle $\alpha$ in excess of 30° with a plane which is defined by the design center line of the camshaft and the axis of the cam follower roller of the rocker lever for actuating the fuel injection unit associated with a cylinder that is adjacent to said given cylinder.

When fuel is being injected into a given cylinder of such in-line engine so that the camshaft supported by bearings in transverse walls of the cylinder head will be deflected and, e.g., the exhaust valve associated with an adjacent cylinder is being opened at the same time, the forces which are due to the acceleration of the valve actuating linkage will act on the valve control cam through the cam follower lever engaging the valve control cam at its accelerating surface or even at the point of maximum acceleration and will tend to increase the deflection of the camshaft. But in accordance with the invention the center of curvature of the engaging surface of the cam follower lever and the point of contact between said engaging surface and valve accelerating surface of the valve control cam are connected by a line that is inclined from the plane in which the camshaft is being deflected so that the valve accelerating force will react on the control cam in a similarly inclined direction. As a result, only a relatively small component of said accelerating force can react on the cam-shaft in a sense to increase the deflection of the camshaft so that that deflection will be smaller and the valve motion will be more exactly controlled than in the prior art. For this reason it is not necessary to provide a camshaft which is very thick and stiff and has undesirably large material and space requirements. Besides, the risk of an indentation of the engaging surface of the cam follower lever by the edge of the valve control cam will be reduced because the smaller deflection of the camshaft will result in a smaller angular movement of the confronting generatrices of the valve control cam and the engaging surface in the plane in which the camshaft is deflected.

In a particularly desirable embodiment of the invention, each cam follower lever is formed at one end with a ball socket, which is movably mounted on a ball head mounted in the cylinder head, each cam follower lever has at the opposite end a spherical pressure applying surface, which cooperates with a planar surface on an intermediate member secured to a valve stem, and said intermediate member is provided on both sides with guiding surfaces which extend on both sides of and are arranged to guide the adjacent end of the cam follower lever. In such an arrangement the cam follower lever can adapt to any permanent deformation of the camshaft to such an extent that an application of edge pressure will be entirely avoided because the cam follower lever can be tilted about an axis that extends through the center of the ball socket and the center of the spherical pressure applying surface. The guiding surfaces will prevent an excessive lateral movement of the cam follower lever at its end that is adjacent to the valve.

Different from the above-described arrangement disclosed in Published German Application 3,210,165 the cam follower lever designed in accordance with the invention has only a small moment of inertia about the axis of its tilting movement because the cam follower lever is formed with the spherical pressure applying surface adjacent to the valve and does not carry a ball head pin. As a result, the cam follower lever can easily adapt to the deformation of the camshaft.

BRIEF DESCRIPTION OF THE DRAWING

The drawing is a vertical sectional view showing by way of example the top portion of an air compressing reciprocating in-line compression-ignition internal combustion engine provided with a cam mechanism in accordance with the invention, the section being taken on a plane extending through a gas exchange valve.

DETAILED DESCRIPTION OF THE PREFERRED EMBODIMENT

A cylinder head 1 of an in-line diesel engine comprises transverse walls 2, in which a camshaft 3 is rotatably mounted. The camshaft 3 carries injection control cams 4, each of which actuates via a rocker lever 5 a fuel injection unit 6, which is associated with each cylinder and comprises a fuel injection pump and a fuel injection nozzle. Each rocker lever 5 carries a rotatably mounted cam follower roller 7, which bears on the associated injection control cam 4. The camshaft 3 carries also valve control cams 8, which are disposed beside each injection control cam 4 and serve to control the gas exchange valves associated with the cylinders. Said valve control cams 8 cooperate with cam follower levers 9, which are formed at one end with a ball socket 10, which is movably mounted on a ball head 11 that is mounted in the associated cylinder head 1. At the other end, each cam follower lever 9 is formed with a spherical pressure applying surface 12, which bears on a planar surface of an intermediate member 13, which is mounted on the stem 14 of the associated gas exchange valve. The intermediate member 13 has guiding surfaces 15 extending on both sides of the adjacent end portion of the cam follower lever.

In accordance with the invention the center of curvature M1 of the engaging surface 9' of the cam follower lever and any point of contact P between said engaging surface 9' and the valve accelerating side face of the associated valve control cam 8 are connected by a line V which includes a smaller angle α in excess of 30° with the plane E that is defined by the design center line M of the camshaft and the axis of the pressure applying roller 7 of the rocker lever 5 for actuating the fuel injection unit 6 of the adjacent cylinder.

I claim:

1. In an air compressing reciprocating in-line compression-ignition internal combustion engine comprising
a plurality of cylinders arranged in a row,
cylinder head means comprising transverse walls extending transversely to said row between adjacent ones of said cylinders,
gas exchange valve means for each of said cylinders,
a plurality of fuel injection units associated with respective ones of said cylinders,
a camshaft having a design center line and extending along said row and rotatably mounted in said transverse walls and carrying a plurality of injection control cams associated with respective ones of said fuel injection units and a plurality of valve control cams associated with the gas exchange valve means of respective ones of said cylinders, each of said valve control cams having a valve accelerating surface,
a plurality of rocker levers, each of which carries a cam follower roller for contacting ones of said injection control cams and is arranged to operate one of said fuel injection units in response to the rotation of said camshaft,
a plurality of cam follower levers, each of which is pivoted to one of said cylinder heads and has a cylindrically curved engaging surface for contacting one of said valve control cams also at said valve accelerating surface and is associated with one of said rocker levers and arranged to operate said gas exchange valve means of one of said cylinders in response to the rotation of said camshaft,
said cam follower rollers and said engaging surface being disposed on mutually opposite sides of said camshaft,
said design center line and the axis of each of said cam follower rollers defining a plane, the improvement residing in that the center of curvature of the engaging surface of one of said cam follower levers which is associated with any of said rocker levers and the point of contact between said engaging surface and said valve accelerating surface of the associated valve control cam are connected by a line that includes a smaller angle in excess of 30 degrees with said plane defined by said design center line and the axis of said cam follower roller that is associated with a rocker lever that is adjacent to said one rocker lever.

2. The improvement set forth in claim 1 as applied to an engine in which intermediate members are mounted on said gas exchange valve means and engaged by said cam follower levers.

3. The improvement set forth in claim 2 as applied to an engine in which each of said cam follower levers is pivoted at one end to said cylinder head means and is provided at the other end with a spherical pressure applying surface and is formed with said engaging surface between its two ends, wherein said cam follower lever is connected at said one end to said cylinder head means by a ball and socket joint and each of said intermediate members has a planar surface in contact with said spherical pressure applying surface and provided with two guiding ribs extending along said camshaft on opposite sides of said spherical pressure applying surface.

4. The improvement set forth in claim 3, wherein said other end of each of said cam follower levers is pinless.

5. The improvement set forth in claim 3 as applied to an engine in which said gas exchange valve means comprise valve stems on which said intermediate members are mounted.

6. The improvement set forth in claim 5, wherein said intermediate members are immovably mounted on said valve stems.

7. The improvement set forth in claim 3, wherein each of said ball and socket joints comprises a ball socket formed in said cam follower lever at said one end thereof and a ball head mounted in said cylinder head means.

8. In an air compressing reciprocating in-line compression-ignition internal combustion engine comprising a plurality of cylinders arranged in a row, cylinder head means comprising transverse walls extending transversely to said row between adjacent ones of said cylinders, gas exchange valve means for each of said cylinders, a plurality of fuel injection units associated with respective ones of said cylinders, a camshaft having a design center line and extending along said row and rotatably mounted in said transverse walls and carrying a plurality of injection control cams associated with respective ones of said fuel injection units and a plurality of valve control cams associated with the gas exchange valve means of respective ones of said cylinders, each of said valve control cams having a valve accelerating surface, a plurality of rocker levers, each of which carries a cam follower roller for contacting ones of said injection control cams and is arranged to operate one of said fuel injection units in response to the rotation of said camshaft, a plurality of cam follower levers, each of which is pivoted to one of said cylinder heads and has a cylindrically curved engaging surface for contacting one of said valve control cams also at said valve accelerating surface and is associated with one of said rocker levers and arranged to operate said gas exchange valve means of one of said cylinders in response to the rotation of said camshaft, said cam follower rollers and said engaging surfaces being disposed on mutually opposite sides of said camshaft, said design center line and the axis of each of said cam follower rollers defining a plane, the improvement residing in that each of said cam follower levers is pivoted at one end to said cylinder head means and is provided at the other end with a spherical pressure applying surface and is formed with said engaging surface between its two ends, said cam follower lever is connected at said one end to said cylinder head means by a ball and socket joint and each of said intermediate members has a planar surface in contact with said spherical pressure applying surface and provided with two guiding ribs extending along said camshaft on opposite sides of said spherical pressure applying surface.

* * * * *